No. 685,610. Patented Oct. 29, 1901.
G. HUHN.
FLANGE PACKING.
(Application filed Mar. 18, 1901.)
(No Model.)

Witnesses
Inventor
Gustav Huhn
By H. B. Willson & Co.
Attorneys

UNITED STATES PATENT OFFICE.

GUSTAV HUHN, OF BERLIN, GERMANY.

FLANGE-PACKING.

SPECIFICATION forming part of Letters Patent No. 685,610, dated October 29, 1901.

Application filed March 18, 1901. Serial No. 51,719. (No model.)

*To all whom it may concern:*

Be it known that I, GUSTAV HUHN, merchant, a subject of the King of Prussia, Emperor of Germany, residing at Cuxhavenerstrasse 15, Berlin, in the Kingdom of Prussia and Empire of Germany, have invented certain new and useful Improvements in Flange-Packing, of which the following is a full, clear, and exact description.

The flange-packing which is the object of the present invention is formed by a hollow metal ring of moderate thickness, the hollow of the ring being impermeably shut off from the external air. When the flange-screws are tightened, the ring is flattened down; but as when this occurs the air in the ring is likewise, so to say, forcibly compressed, and consequently has a strong tendency to restore the ring to its rounded form in opposition to the pressure of the flange-screws, the packing-ring may be employed for rough cast flanges or for rough wrought flanges, as the internal pressure forces the metallic body of the ring into the recesses of the rough surfaces of the flanges, so that a perfect packing or impermeableness is secured. The hollow space in the ring may contain, together with air or some other gas, a soft substance which is displaced or flows away under very slight pressure, whereby the space in the ring which is filled with gas is considerably diminished. Thus the pressure of the gas in the ring when the flange-screws are tightened increases much more quickly, and before the ring is flattened to any great extent its sides are pressed into the uneven surfaces of the flanges.

Figure 1:
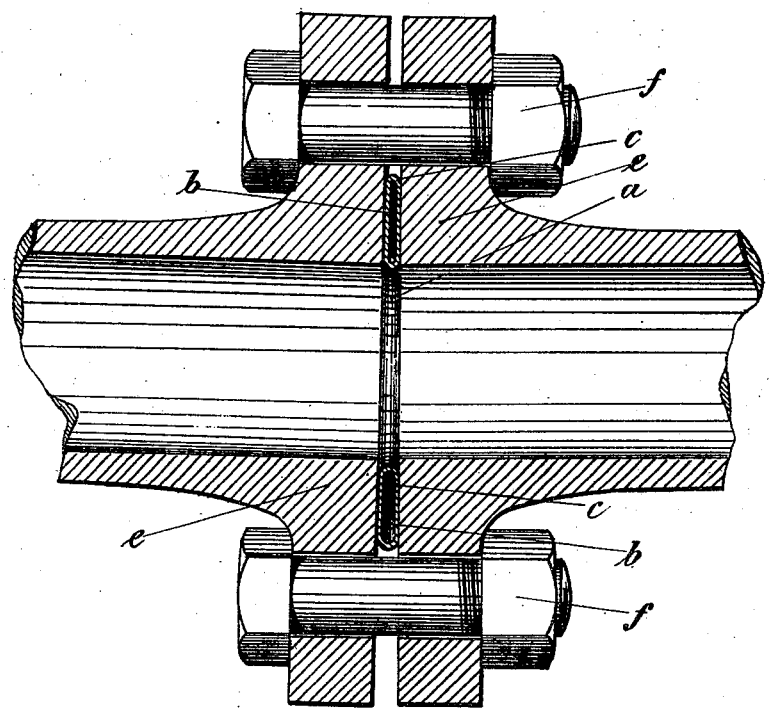
Figures 2, 3:
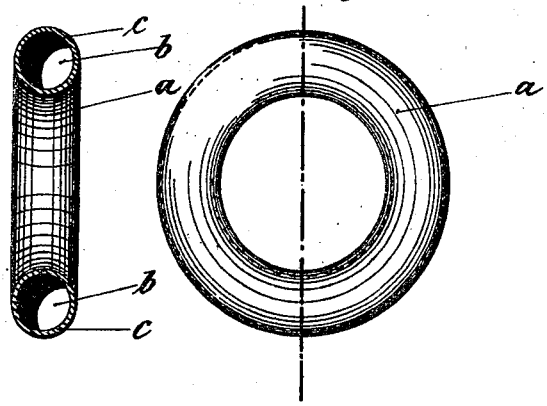

The accompanying drawings illustrate the ring in Figure 1 as in use, Fig. 2 being a transverse section of the ring and Fig. 3 an elevation of the same.

The ring $a$ prior to use is preferentially of circular cross-section, as shown in Fig. 2, but may be made elliptical beforehand, if preferred. As stated in the introduction, it is made relatively slight and its hollow space $b$ is completely shut off against the external air, so that the gas or air contained in it can only escape when the ring is so far compressed that the gas or air forces its way by its own pressure through the side $c$ of the ring. As shown in Fig. 1, the ring is laid in the usual way between the two flanges $e$ and the screws $f$ screwed up. The ring is thus flattened and pressed tightly against the flange-surfaces. This is also the case when, as shown in Fig. 1, the two flanges are pressed together somewhat obliquely. If the flange junction is to be kept tight against great internal pressure, the flanges must be screwed up tighter than when the pressure in the pipe is but slight. Rough flanges, however, that are not turned being used, the ring will hold perfectly tight if the screws are screwed up strongly enough, as the high gas-pressure which appears in the ring itself presses the side $e$ of the ring $a$ into any recesses or uneven parts of the flange-surfaces. This effect is also produced when the flanges are screwed up obliquely, as the air or gas in the ring can be freely displaced. Thus uniform pressure prevails over all parts.

In order, as mentioned, to bring about a more rapid pressure of the ring $a$, it is desirable to partially fill the hollow of the ring with some fluid or other substance which easily yields to slight pressure—such, for example, as a fatty material. On account of the reduction in the volume of the gas effected in this way the tension in the ring when the latter is screwed to a certain pitch is far more rapid. Thus the more quickly is the pressure produced which is sufficient for pressing the material forming the ring into any uneven parts of the flange-surfaces. When the flanges are screwed up obliquely—that is, when there is a one-sided compression of the ring—tightness will also be secured over the whole circumference, as the fluid or soft substance contained in the ring is easily displaced. Thus there is a uniform pressure in the whole hollow space of the ring.

The material of the packing-ring is a soft and pliable metal. In such a ring if a filling having a body firm enough to positively resist the compression of the ring be employed the results would not be commensurate with the objects of the invention, which are that the interior resistance shall be equal throughout the interior and that the resistant may extend without distortion of the ring to all parts and yet have such power as to force the surface of the ring into all parts of the varying surfaces of the contacting parts compressing the ring.

What I claim, and desire to secure by Letters Patent, is—

In a flange-packing, the combination with flanges having roughened face portions, of a closed collapsible hollow packing-ring interposed between said flanges, the bore of the ring being partly filled with an unctuous material, and means for securing said flanges in an oblique position, whereby to force the sides of the ring into the roughened face portions of the flanges by pressure of said flanges toward each other, substantially as specified.

In witness whereof I subscribe my signature in presence of two witnesses.

GUSTAV HUHN.

Witnesses:
HUGO FIEDLER,
WOLDEMAR HAUPT.